Patented May 12, 1925.

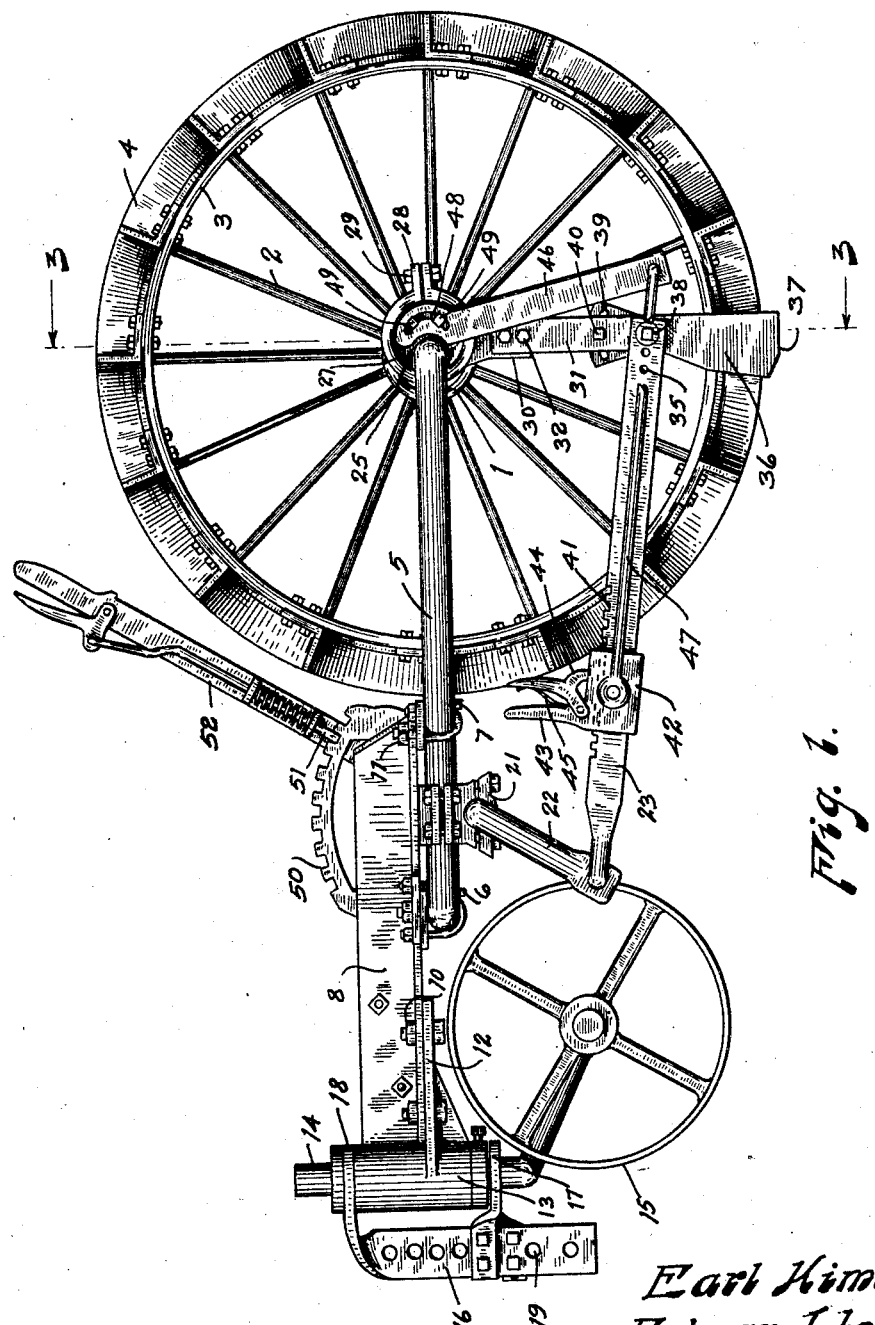

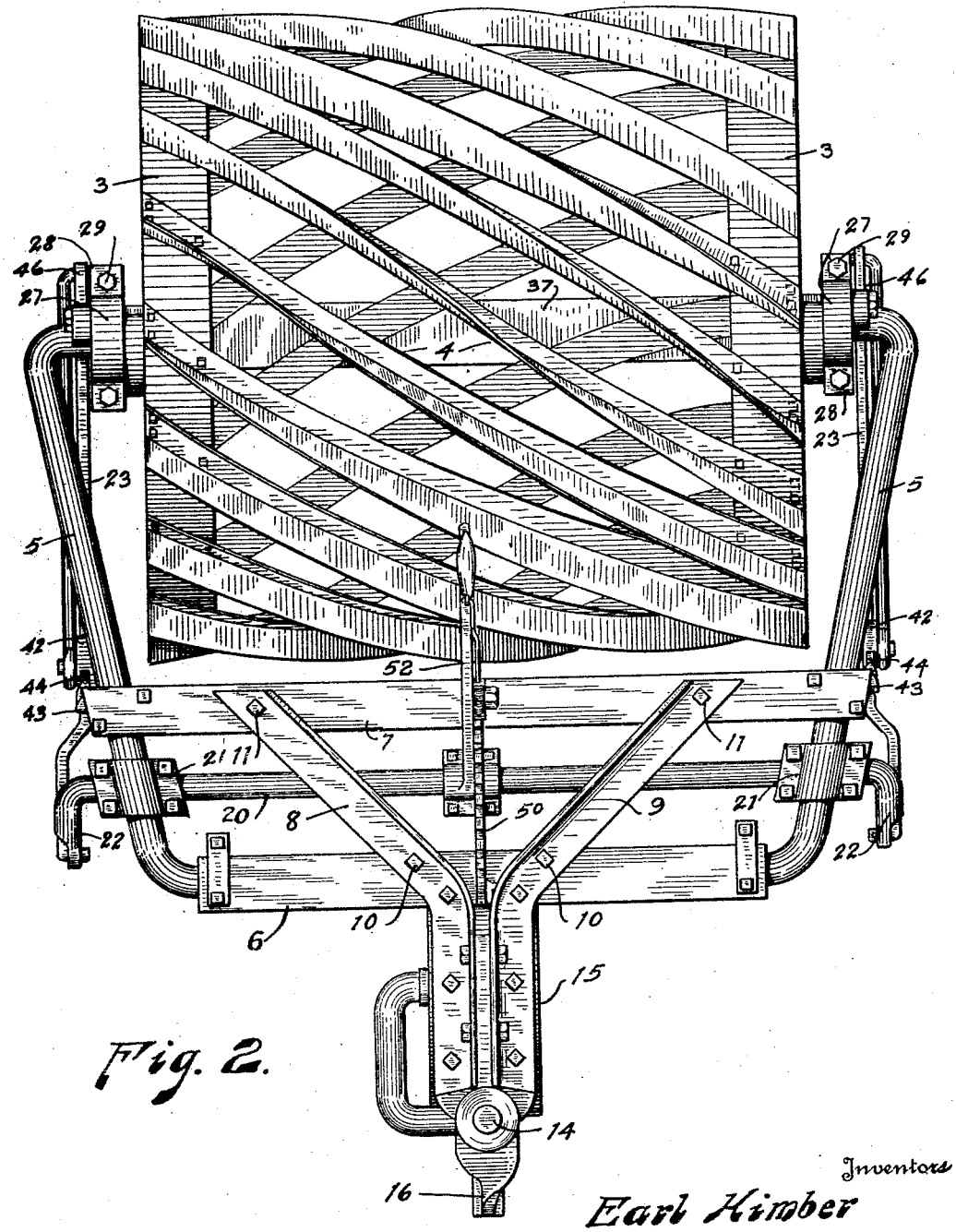

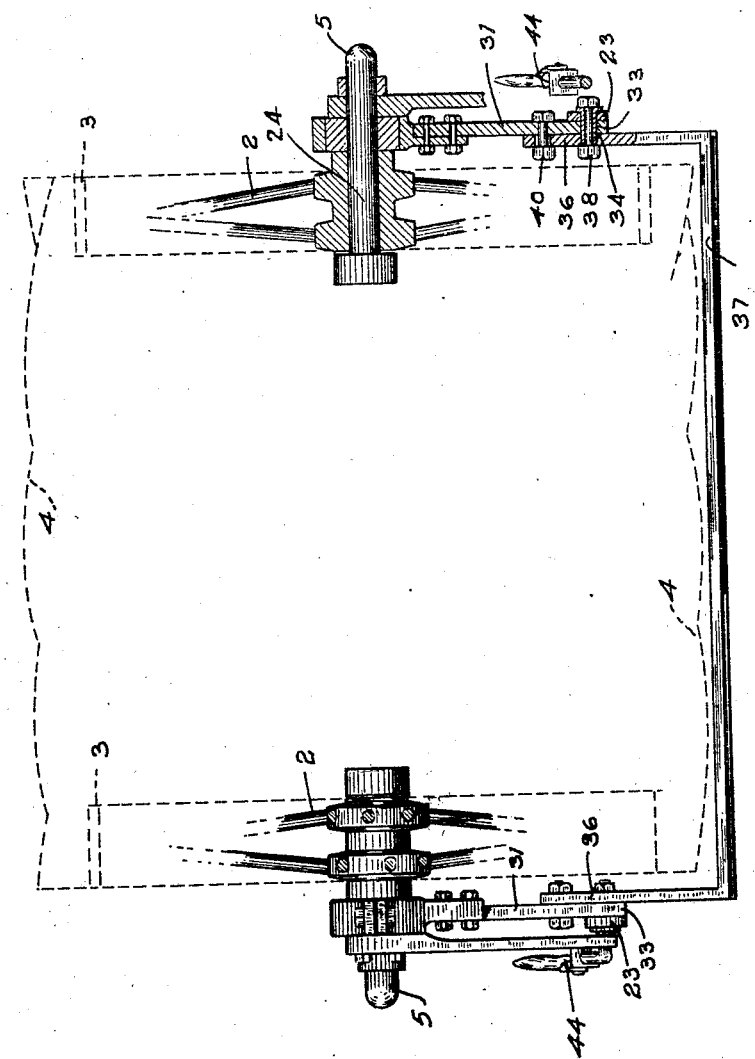

1,537,310

UNITED STATES PATENT OFFICE.

EARL KIMBER AND EDGAR LLOYD, OF WRAY, COLORADO.

WEEDER AND CULTIVATOR.

Application filed January 31, 1924. Serial No. 689,769.

*To all whom it may concern:*

Be it known that we, EARL KIMBER and EDGAR LLOYD, citizens of the United States, residing at Wray, in the county of Yuma and State of Colorado, have invented certain new and useful Improvements in Weeders and Cultivators; and we do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to improvements in combined weeders and cultivators intended particularly to meet the requirements of summer fallow ground after the soil has been plowed or tilled deep with some other implement.

In the western half of the United States, it is customary to practice summer fallowing for the purpose of storing and carrying the rainfall of one year over until the next or crop year, thereby enriching and mellowing the soil and killing the weeds. The method usually employed is to plow the ground in the spring, then pack the subsurface, leaving a loose, shallow mulch on top which breaks the capillary attraction, thereby preventing evaporation and retaining the moisture.

In the arid and semi-arid sections of our country, the soil dries out in a very short time down to the depth of the loose mulch, and since it is very important that the seed bed be kept firmly packed to shut out the air, it is desirable to have the dust mulch as shallow as possible.

After each rain a crust forms over the surface which reestablishes the capillary attraction. This crust must be broken up at once in order to prevent the weeds from getting a start and the moisture from being lost through evaporation. The breaking of this crust must be done by shallow surface cultivation for the reason that if the ground is cultivated too deeply it is put into the same condition as it was when first plowed, which is disastrous when done late in the season, when, as a rule, no rain falls for several months. If there is no moisture close to the surface, the wheat will not come up, and, unless it gets a good growth in the fall, the high winds during the fall and winter will blow the soil away and kill the wheat.

It is the object of our invention to produce a machine that can be employed directly after plowing as a subsurface packer and smoothing harrow, and which can thereafter be used as a mulcher and weeder.

Our implement, briefly described, consists of a roller having spirally arranged angle irons secured to its outer surface and arranged with one flange radial. A knife or cutting bar is fastened to the roller axle and extends longitudinally of the roller and in close proximity to the flanges of the angles. This bar is adjustable radially and circumferentially, and is intended to be so adjusted that it will be pulled along under the surface of the soil so as to kill the weeds.

Our invention can be most clearly described and is most readily understood when reference is had to the accompanying drawings in which the preferred embodiment is shown, and in which:

Fig. 1 is a side elevation of our implement;

Fig. 2 is a top plan view thereof; and

Fig. 3 is a section taken on line 3—3, Fig. 1.

Our invention comprises a roller which is formed from two parallel end wheels having hubs 1, spokes 2 and rims 3. The rims are connected by angle irons 4 which are bent and curved so as to form a cylindrical surface composed of a plurality of radial flanges extending helically in the manner shown on the drawing. The roller is connected to a frame comprising a bar 5 whose ends engage and are journaled in the hubs of the wheels. An angle bar 6 is secured to the front end of the frame member 5 and a similar angle 7 is secured to the frame member a short distance to the rear of the bar 6 and parallel to the latter. Two bent angle iron members 8 and 9 are secured to the angles 6 and 7 by means of bolts 10 and 11. Secured to the front ends of members 8 and 9 is a casting 12 which has a vertical tubular portion 13 that forms the bearing for the stem 14 of the frame for the caster wheel 15. A hitch member 16 for connecting the tractor or the horses is secured to the stem 14 by means 17 and 18 and is provided with several openings 19 for the purpose of adjustment. A bar 20 is secured to the frame 5 intermediate angles 6 and 7, and parallel with the latter. Bar 20 is pivoted in bearings 21 and has its ends 22 bent at right angles so as to form cranks to the ends of which the rods 23 are connected. Rotatably secured to the axle portions 24 of the frame 5 are eccentrics 25 which have openings for bolts 49. An eccentric strap 27 surrounds the eccentric and has outwardly extending ears 28 for the reception of a clamping bolt 29. The strap may be made in two parts if desired and held together by two bolts. The straps 27 have formed integral therewith a downwardly projecting lug 30, to which a flat bar 31 is secured by means of bolts 32. The lower end of the bar 31 is provided with an opening 33 for the reception of a ferrule 34. This ferrule also extends through one of the openings 35 in the connecting rod 23 and abuts its inner end against the vertical end 36 of the knife 37. A bolt 38 passes through the bushing 34 and through an opening in member 36 and serves to hold members 23, 31 and 36 in assembled relation. The upper end of the vertical part 36 is provided with an elongated arcuate opening 39 whose center of curvature is the center of bolt 38. A bolt 40 passes through a hole in member 31 and through the slot 39 and serves to clamp the two members against relative rotation about bolt 40, but permits adjustment to be made. The connecting rod 23 is provided with a plurality of notches 41 and has slidably connected thereto a member 42 that has an upwardly extending handle 43 and a pivotally mounted detent member 44 that is normally retained in engagement with one of the notches 41 by means of a spring 45. Secured to the outside of the eccentric 25 is an arm 46, the lower end of which is connected to member 42 by means of a rod 47. Arm 46 is provided at its upper end with an arcuate slot 48 for the reception of bolts 49, by means of which it can be clamped to the eccentric. When the slide 42 is moved along the rod 23, the eccentric is rotated relative to the strap 27 and the knife 37 moved towards or away from the flanges of angles 4. Secured at its ends to angles 6 and 7 is an arcuate notched member 50 which cooperates with the detent 51 on the handle 52, the lower end of which is connected to the bar 20. By means of handle 52 the position of the knife or cutter 37 can be altered at will and the depth at which the cutting is done regulated. When the parts are adjusted as shown in Fig. 1, the cutter is located with its front edge substantially vertically below the axis of the roller and will cut the thickest layer. The thickness of the cut can be decreased until at last the cutter will be above the level of the surface. Owing to the fact that the angles 4 are spiraled, there will be a shearing action between the flanges and the cutter analogous to that between the knives and the corresponding cutter of an ordinary lawn mower. This shearing action keeps the flanges clean. In order to move the cutter bar with respect to the flanges of the roller, the member 42 is moved on the connecting rod 23 in the manner above described. In the drawing I have shown only a single roller, but it is evident that two or more may be used if desired.

The first time over the ground after it has been plowed, the device described can be used as a subsurface packer and smoothing harrow. The radial flanges of the angles will cut into the soil and the weight of the machine will cause it to pack the ground, breaking the soil. By lowering the knife or cutter into the ground to a depth of one inch or so, all large lumps and clods will be broken, leaving a shallow mulch on the surface. Where the device is used as a weeder, the knife can be regulated to any desired depth by shifting the lever 52. The scissor action between the knife and the radial flanges cuts the roots off below the surface of the ground and kills the weeds.

When the machine is to be used for breaking the crust in the spring time, after a winter with a heavy snow fall, the knife can be raised out of the ground and the roller with its curved flanges will cut the crust without injuring the wheat.

Having now described our invention, what we claim is:

1. In a machine of the class described, in combination, a roller having an outer surface formed by a plurality of outwardly projecting helically arranged flanges, a frame to which the roller is pivotally connected, a caster guide-wheel secured to one end of said frame, a knife member secured to said frame, said knife extending parallel to the axis of the roller and in close proximity to the outer edges of said flanges, and means for adjusting said knife radially, said means comprising eccentrics rotatably secured to the axle of said roller.

2. In a machine of the class described, in combination, a roller having an outer surface formed by a plurality of outwardly projecting helically arranged flanges, a frame to which the roller is pivotally connected, a caster guide-wheel secured to one end of said frame, a knife member secured to said frame, said knife extending parallel to the axis of the roller and in close proximity to the outer edges of said flanges, means for adjusting said knife radially, said means comprising eccentrics rotatably secured to the axle of said roller, and means for adjusting said eccentrics rotatably on said axle.

3. In a machine of the class described, in combination, a roller having an outer surface formed by a plurality of outwardly projecting helically arranged flanges, a frame to which the roller is pivotally connected, a caster guide-wheel secured to one end of said frame, a knife member secured to said frame, said knife extending parallel to the axis of the roller and in close proximity to the outer edges of said flanges, means for adjusting said knife radially, said means comprising eccentrics rotatably secured to the axle of said roller, means for adjusting said eccentrics rotatably on said axle, said means comprising an arm secured to the eccentric, and means for holding said arm in adjusted position.

4. In a machine of the class described, in combination, a frame having axle portions, a roller connected to said axle portions and rotatable thereon, one end of said frame being supported on a caster guide-wheel, said roller having helical flanges projecting radially therefrom, a knife member extending longitudinally of the roller in close proximity to said flanges, and means for adjusting said knife radially, said means comprising eccentrics mounted on the axle portion of said frame, an eccentric strap about each eccentric, means for connecting said strap to the knife, and means for adjusting the eccentric with respect to the strap.

5. In a machine of the class described, in combination, a frame having axle portions, a roller connected to said axle portions and rotatable thereon, one end of said frame being supported on a caster guide-wheel, said roller having helical flanges projecting radially therefrom, a knife member extending longitudinally of the roller in close proximity to said flanges, means for adjusting said knife radially, said means comprising eccentrics mounted on the axle portion of said frame, an eccentric strap about each eccentric, means for connecting said strap to the knife, means for adjusting the eccentric with respect to the strap, said last-named means comprising an arm secured to the eccentric, and means for holding said arm in adjusted position.

In testimony whereof we affix our signatures.

EARL KIMBER.
EDGAR LLOYD.